(12) United States Patent
Schoenfeld et al.

(10) Patent No.: US 9,279,054 B2
(45) Date of Patent: Mar. 8, 2016

(54) SOUND-ABSORBENT FOAM SYSTEM

(75) Inventors: Uwe Schoenfeld, Schrozberg (DE); Klaus Dippon, Markt Erlbach (DE)

(73) Assignee: Preform GmbH, Feuchtwangen (DE)

( * ) Notice: Subject to any disclaimer, the term of this patent is extended or adjusted under 35 U.S.C. 154(b) by 0 days.

(21) Appl. No.: 12/918,145

(22) PCT Filed: Feb. 4, 2009

(86) PCT No.: PCT/EP2009/000754
§ 371 (c)(1),
(2), (4) Date: Nov. 10, 2010

(87) PCT Pub. No.: WO2009/103420
PCT Pub. Date: Aug. 27, 2009

(65) Prior Publication Data
US 2011/0057144 A1 Mar. 10, 2011

(30) Foreign Application Priority Data

Feb. 18, 2008 (EP) .................................. 08002952

(51) Int. Cl.
| | |
|---|---|
| C08L 97/00 | (2006.01) |
| C08G 18/36 | (2006.01) |
| C08G 18/10 | (2006.01) |
| C08G 18/08 | (2006.01) |
| C08H 8/00 | (2010.01) |
| C08L 75/04 | (2006.01) |
| C08L 77/00 | (2006.01) |
| E04B 1/82 | (2006.01) |
| E04B 1/74 | (2006.01) |
| C08G 101/00 | (2006.01) |

(52) U.S. Cl.
CPC ............. C08L 97/00 (2013.01); C08G 18/10 (2013.01); C08G 18/14 (2013.01); C08G 18/36 (2013.01); C08H 8/00 (2013.01); C08L 75/04 (2013.01); *C08G 2101/0025* (2013.01); *C08G 2101/0058* (2013.01); *C08G 2101/0083* (2013.01); *C08G 2350/00* (2013.01); C08L 77/00 (2013.01); E04B 1/82 (2013.01); *E04B 2001/742* (2013.01)

(58) Field of Classification Search
CPC .......... C08G 18/10; C08G 18/14; C08H 8/00; C08L 75/02; C08L 97/00; C08L 75/00
USPC ........... 521/82, 84.1, 89, 99, 109.1, 120, 121, 521/155
See application file for complete search history.

(56) References Cited

U.S. PATENT DOCUMENTS

| | | | | |
|---|---|---|---|---|
| 2,787,601 | A | * | 4/1957 | Detrick et al. ................. 521/159 |
| 3,894,878 | A | | 7/1975 | Mansmann et al. |
| 4,105,594 | A | * | 8/1978 | Dieterich et al. ............. 521/100 |
| 4,125,664 | A | * | 11/1978 | Giesemann ..................... 428/48 |
| 4,209,427 | A | | 6/1980 | Williams |
| 4,596,665 | A | | 6/1986 | Gonzalez et al. |
| 4,826,383 | A | | 5/1989 | Millen |
| 4,863,975 | A | | 9/1989 | Knobel et al. |
| 4,940,469 | A | | 7/1990 | Moeckel et al. |
| 5,130,344 | A | | 7/1992 | Kollmeier et al. |
| 5,135,805 | A | * | 8/1992 | Sellers et al. ................. 442/386 |
| 5,187,204 | A | | 2/1993 | Jackson et al. |
| 6,316,514 | B1 | | 11/2001 | Falke et al. |
| 6,448,307 | B1 | | 9/2002 | Medoff et al. |
| 6,680,349 | B2 | | 1/2004 | Zhang et al. |
| 6,790,520 | B1 | | 9/2004 | Todd et al. |
| 2003/0139319 | A1 | * | 7/2003 | Scheibel ........................ 510/462 |
| 2005/0014002 | A1 | | 1/2005 | Varadaraj |
| 2006/0280702 | A1 | | 12/2006 | SenGupta et al. |
| 2007/0066692 | A1 | | 3/2007 | De Juan Saiz et al. |

FOREIGN PATENT DOCUMENTS

| | | |
|---|---|---|
| CA | 2 044 168 A1 | 9/1990 |
| CA | 2 231 428 A1 | 3/1997 |
| CA | 2 580 624 A1 | 3/2006 |
| DE | 1 248 286 B | 8/1967 |
| DE | 28 53 884 A1 | 7/1979 |
| DE | 25 24 191 C3 | 4/1980 |
| DE | 39 09 083 C1 | 6/1990 |
| DE | 39 28 867 C1 | 10/1990 |
| DE | 39 42 760 A1 | 7/1991 |
| DE | 292 467 A5 | 8/1991 |
| DE | 43 03 809 C2 | 3/1996 |
| DE | 692 07 437 T2 | 6/1996 |
| DE | 195 33 564 A1 | 3/1997 |
| DE | 691 31 452 T2 | 11/1999 |
| DE | 195 39 309 C2 | 1/2000 |
| DE | 199 24 802 A1 | 11/2000 |
| DE | 100 04 225 A1 | 5/2002 |
| DE | 197 12 835 C3 | 5/2002 |

(Continued)

OTHER PUBLICATIONS

J. H. Saunders; "Fundamentals of Foam Formation" in D. Klempner's K.C. Handbook of Polymeric Foams and Foam Technology; 1991; pp. 6-15 (p. 12); Hanser Verlag Munich, Germany.
Von Hermann Oberst; "Werkstoffe mit extrem hoher innerer Daempfung" in Acustica; 1956; pp. 144-153; Munich, Germany.
Ullmann'S Encyclopedia of Industrial Chemistry; "Cellulose Holz und Lignin"; 1978; pp. 255-258.
Von Werner Siefken; Justus Liebigs Annalen der Chemie; vol. 562; 1948; pp. 75-136.
Arbuzov et al; Database WPI Week 198332, Thomson Scientific, London, GB, AN 1983-733173; XP002519215; "Composition for Making Heat Insulating Material", 1982; and SU 962 270A.
Dolgorev, et al; Database WPI Week 198644; Mar. 15, 1986; vol. 1986, No. 44; Derwent Publications Ltd., London, GB; XP002479363;."Method of Manufacturing Gypsum-Paperboard Sheets"; and SU 1 217 838 A.

(Continued)

*Primary Examiner* — Melissa Rioja
(74) *Attorney, Agent, or Firm* — Marshall & Melhorn, LLC

(57) ABSTRACT

The present invention relates to a novel sound-absorbent foam system in the form of an open-cell mineral-organic material, which can even attain building material class B1 according to DIN 1402 and is used for reducing sound levels, in particular in interior spaces. The material is distinguished by containing lignosulphonate.

20 Claims, 2 Drawing Sheets

(56) References Cited

FOREIGN PATENT DOCUMENTS

| | | |
|---|---|---|
| DE | 101 18 136 A1 | 10/2002 |
| DE | 698 20 676 T2 | 6/2004 |
| DE | 103 36 938 A1 | 3/2005 |
| DE | 43 18 120 C5 | 5/2005 |
| DE | 10 2005 055 575 A1 | 5/2007 |
| DE | 10 2004 046 172 B4 | 8/2007 |
| EP | 0 328 485 A1 | 8/1989 |
| EP | 1 186 630 B1 | 2/2004 |
| EP | 1 498 464 A1 | 1/2005 |
| FR | 1 461 357 A | 2/1966 |
| FR | 2 890 888 A1 | 3/2007 |
| SU | 962270 A1 | 9/1982 |
| SU | 1217838 A1 | 3/1986 |

OTHER PUBLICATIONS

CMS Deutschland; "Daemmstoffe aus der heimischen Natur"; (ed.); 1997; pp. 8-9, 12, 16-17, 20-21, 24, 26, 28-30, and 32-33; Germany.

Dr. Guenter Oertel; "Polyurethane, Becker Braun Kunststoff Handbuch"; vol. 7; 1983; Hanser Verlag, Munich, Germany.

\* cited by examiner

———— porous absorber    — — - resonator

General frequency-dependent curves of the degrees of sound absorption $\alpha$
for porous absorbers and resonators G' = Storage modulus
G" = Loss modulus Storage modulus and loss modulus as well as loss factor tan δ of the viscoelastic polymer which is obtained by reacting the prepolymers with water in accordance with Example 4.

SOUND-ABSORBENT FOAM SYSTEM

BACKGROUND OF THE INVENTION

The present invention relates to a novel sound-absorbing foam system in the form of an open-cell, mineral-organic material which can also achieve building material class B1 pursuant to DIN 1402 and is used for reducing sound levels, in particular in interior rooms. The material is characterised in that it contains lignin sulphonate.

The acoustic ratios in rooms depend heavily upon architectural factors. The parameters which determine the acoustic effect of a room can be influenced to a greater or lesser extent by a corresponding interior design. In addition to the simple noise reduction, adapting the acoustic properties of a room to its intended purpose is an important aim in room acoustics. In contrast to the outside world, the sound fields in rooms are diffuse since they are generated from direct and reflected sound. They can be controlled by correspondingly reducing the sound level. Technical sound absorbers are used for this purpose which permit targeted absorption and reflection processes.

In basic terms, technical absorbers can be split into 2 groups depending upon their mode of operation, namely resonators and porous absorbers.

In very general terms, resonators operate as acoustic spring-mass systems which have a distinct sound absorption peak. Plate resonators, Helmholtz resonators or micro-perforated absorbers are examples of such sound absorbers.

In contrast thereto, the sound energy is absorbed in porous absorbers firstly by way of friction on the pore walls where the sound energy is converted into heat energy. An open-cell structure having sufficient porosity is required for this purpose. Owing to the sound absorption produced primarily by way of dissipation, porous sound absorbers have a sound absorption spectrum which is significantly different to that of resonators. In the ideal scenario, the frequency-dependent degree of sound absorption continuously increases in an s-shaped manner at higher frequencies and asymptotically approximates a maximum value. FIG. 1 shows a typical sound absorption spectrum of a resonator and porous absorber. Porous absorbers can be constructed in a variety of ways. The material options are extremely diverse.

An improvement in the sound-absorbing properties of porous absorbers for the frequency range <1000 Hz can only be achieved by adding further sound-absorbing features. In combination with perforated plates, such a system additionally has the function of a Helmholtz resonator which means that in this case higher degrees of sound absorption can also be achieved in the lower frequency range. This is associated with an additional material outlay and further working processes.

In addition, the improvement in the sound absorption in this frequency range can also be achieved by significantly increasing the absorber mass, which is in no way desirable in many applications.

The most popular systems for sound absorption, their materials and the associated characteristics will be briefly described hereinafter:

Fibre-Containing, Porous Sound Absorbers:
Textiles:

In the simplest example, non-coated, open-cell textiles can be used as curtains. In particular lower frequencies, at which porous absorbers demonstrate low absorption behaviour owing to the system, can be reduced by leaving a specific distance with respect to a sound-reflecting wall.

Non-Woven Materials and Felts:

Nowadays, modern non-woven materials and felts for sound absorption applications have an optimum flow resistance and are generally on the market as acoustic non-woven materials or sound-absorbing, fibre insulating materials. The corresponding products can have an increased flame-resistance by means of specific flame retardants and can achieve the building material class B1 "building material having flame-resistant properties". In order to produce acoustic non-woven materials or sound-absorbing, fibre insulating materials, native and also synthetic fibres and fibrous materials are used. Hemp, flax, reed, coconut, cotton, straw and wood or cellulose fibres as well as lamb's wool are examples for the technical use of native fibrous materials in porous sound absorbers. An overview of the native raw materials for producing sound-absorbing fibre insulating materials and their properties can be found for example in "Dämstoffe aus der heimischen Natur", CMS Deutschland (ed.) 1997. In addition, such fibre insulating materials are also produced from the most varied synthetic fibres and fibrous materials such as for example polyester.

Glass and Mineral Substance Materials:

Sound absorbers consisting of glass or mineral fibre materials are widely used. They are produced on a large scale from fine fibre filaments which are processed to form plates or comparatively soft mats. Their bulk densities are between 40 $kg/m^3$ and 250 $kg/m^3$. In order to increase the stability under load, small amounts of binders are frequently added to the fibre products during the production in the fibre application process. Glass and mineral fibre plates are frequently used in acoustic ceilings. Owing to their predominantly or completely inorganic structure, they meet the building material classes A1 or A2 pursuant to DIN 4102. The binders used to produce glass and mineral fibre plates are frequently included among the phenol resins whose ecological and physiological risk potential is not insignificant.

The method described in DE 101 18 136 for producing moulded bodies from a network of mineral fibres demonstrates possibilities of obtaining glass or mineral fibre plates without such a binder by using sodium silicate solutions with subsequent sintering.

Fibre-Free, Porous Sound Absorbers:
Dispersed Solids:

Among the variety of materials of fibre-free, porous sound absorbers, dispersions of solids in the gas phase represent a large and widely used system group. In the simplest case, they firstly have a coagulation structure and can be produced by the feeding of material particles. The solid components can already be present in a porous form. Expanded clay, perlites, expanded layer minerals such as vermiculites, mineral chips, glass foam, wood, cork, cellulose or synthetic materials are examples hereof. These are used for example as loose bulk insulators in partition wall regions, as can be practically applied in structural engineering. Many of said materials can be adhered together under pressure in the filling materials using a corresponding binder. Mineral-inorganic material particles can additionally be fixed together by sintering. More recent examples for dispersed solids which are suitable as technical sound absorbers are listed hereinafter:

DE 10 2005 055 575 A1 describes by way of example filling materials consisting of ballast, expanded clay, concrete, asphalt, wood or various synthetic materials or mixtures hereof which can be bonded together to form corresponding moulded parts using suitable binders and are used as sound-absorbing components for tracks for rail vehicles.

DE 197 12 835 C3 describes sound-absorbing lightweight materials. Expanded clay, perlite or foam glass filling materials having sodium silicate are wetted, dried and then sintered to form moulded bodies having bulk densities of 150-750 kg/m$^3$.

DE 195 39 309 C2 describes a sound protection or sound insulating material as well as a method for the production thereof, which contains fibres and which is simultaneously included in the class of dispersed solids. It is produced by way of a combination, containing a binder, of cellulose fibre filling materials and organic or inorganic secondary raw materials or mixtures hereof.

DE 195 33 564 A1 describes a sound-absorbing composite material which likewise belongs to the latter material group. Aerogel particles are combined with organic or inorganic fibre materials and are processed with water glass or melamine formaldehyde resins to form flat moulded bodies.

Foams:

Foam products are generally two-phase systems, wherein one phase is gaseous and the other phase is solid or liquid. The gaseous phase consists of fine gas bubbles which are either spherical or tetrahedral and are delimited by solid or liquid cell webs.

They can thus be split into two large groups: ball foams and tetrahedron foams. The cell webs are connected together via branch points and form a skeleton.

Foams having sound-absorbing properties are mostly open-celled. In this case, the thin walls between the delimiting webs are destroyed and the cells are connected together. As a result, the material acts as a porous absorber. The material characteristic of the cell webs in open-cell foams is extremely diverse. It ranges from metals to inorganic materials to organopolymers which nowadays represent by far the largest proportion in technical usage and are generally referred to as foamed materials. Depending upon their hardness, organopolymer foams are split into soft and hard foams. For these foams, bubble formation is mostly effected via a blowing gas which is created in situ by a chemical reaction or by a chemical compound which is dissolved in the organic matrix and boils at low temperatures or breaks down into gaseous products. In addition, foams can also be produced by the mechanical mixing-in of gases, by the polymerisation in solution under phase separation or by the use of filling materials which is dissolved away after hardening.

A numerically large proportion of the technically used open-cell organopolymer foams include those whose cellular skeleton is generated from reactive matrices such as PF, MF or PUR. Nowadays, the latter are indispensable in everyday use and in technical use. They can be produced in a comparatively simple and rapid manner as hard or soft foams having the most varied range of property profiles. Open-cell PUR foams are described many times in the literature. An overview can be found in G. Oertel, Polyurethane, Becker Braun Kunststoffhandbuch 7, Hanser Verlag, Munich 1983.

They are typically produced from isocyanate-containing compounds and polyols. Blowing gases are predominantly used to form the foam and are physically effective owing to their low boiling point. Specific blowing gas combinations consisting of physically effective blowing gases and $CO_2$, which is produced by the chemical reaction of the isocyanate groups with water during foaming, are well known. During a reaction of water and isocyanates, in contrast to the reaction with polyols, urea groups are produced in addition to $CO_2$ and contribute to the formation of the cellular skeleton. DD 292 467 contains such a method for the production of elastic and open-cell polyurethane soft foam substances which are obtained from isocyanates and polyether polyols in the presence of water and organic blowing agents.

In view of the discussions regarding global warming, in recent times increased "water-blown" polyurethane foam substances have been developed. The foam is formed, without the aid of physical blowing gases, exclusively by the blowing gas $CO_2$ which is produced by way of the chemical reaction of the isocyanate groups with water. DE 199 05 089 A1 describes by way of example fine-cell, water-blown polyurethane hard foam substances with >85% open cells. This is obtained by converting polyisocyanates with a polyol component present as an emulsion.

Opening the cell walls of water-blown foams by way of mechanical post-treatment (milling) is effected solely on, in particular, soft foams owing to the risk of damage to the foam skeleton. So-called cell openers are frequently used. These weaken the cell walls which are then destroyed at the points of weakness owing to the increasing excess pressure in the cells during the bubble growth when forming the foam. This weakening can be produced for example by solids or other interface-active substances. If the cellular skeleton is generated from reactive components, then further reactants can be added which form phases, which are non-soluble with the surroundings in an early stage during the foaming process, and thereby weaken the cell walls. Specifically in the case of polyurethane foams, cell opening can additionally be supported by way of water vapour which is available as an additional gas amount and becomes effective at an inner temperature of 100° C. (cf. J. H. Saunders, Fundamentals of Foam Formation in D. Klempner, K. C. Handbook of Polymeric Foams and Foam Technology, Hanser Verlag Munich 1991, pg. 12). DE 691 31 452 T2 describes an energy-absorbing polyurethane foam which can be produced in this manner.

The method illustrated in DE 10 2004 046 172 B4 for producing an open-cell polyurethane foam without skin formation also describes the use of water vapour for supporting the opening of the cells. A great deal of technical importance is placed upon the use of additives which are interface-active and weaken the cell walls at their thin locations such that a passage is created during the foaming process. It can be seen from the multitude of solution proposals which can be derived from the current literature in this respect that narrow system limits exist for the desired effect of interface-active, cell-opening additives. Even small changes result in partially serious damage to the cellular skeleton. The most important recent literature references are listed hereinafter in brief:

For example, DE 43 03 809 C2 describes open-cell PUR hard foams consisting of so-called 1-component systems by adding specific liquid polyolefins in amounts of 0.1-3.0% by weight.

FR-A-1 461 357 likewise proposes the use of hydrocarbons for opening cells. U.S. Pat. No. 4,826,383 and U.S. Pat. No. 4,863,975 describes oxynitrate salts as effective cell openers for comparable systems. The use of siloxanes and polysiloxane-polyoxyalkylene block polymers for opening cells is also known, e.g., in DE-A-39 28 867.

In contrast, DE 43 18 120 C5 contains a method for producing open-cell PUR soft foams by using specific polyoxypropylene-polyoxyethylene-polyols which are to have the cell-opening effect.

DE-A-1 2 48 286 and U.S. Pat. No. 4,596,665 describe low-molecular polyglycols or polyoxyalkylene oxides which are to facilitate the open-cell PUR soft foams. DE 100 09 649 and DE 103 36 938 describe open-cell polyurethane hard foams which are obtained by way of the use of polyol components consisting of esterification products of glycerine and castor oil or polyether alcohols.

However, sound energy can also be converted into other energy forms by way of relaxation processes in the skeleton substance. Polymer-organic foams, whose polymer skeleton is set such that large relaxation processes can occur in the corresponding region, have significant sound-absorbing properties in that location. The impinging sound waves cause the skeleton to vibrate. Owing to the relaxation processes taking place, the vibration energy is converted in particular into heat (cf. H. Oberst, Werkstoffe mit extrem hoher innerer Dämpfung in Acustica, 1955, pg. 141-pg. 151). Laid-open document 28 35 329 contains for example a polyurethane foam for the purposes of reducing noise. By suitably adjusting the relaxation processes, high sound absorptions in the range of <300 Hz at a sample thickness of 30 mm were achieved. DE 199 24 802 A1 describes a method for the "Herstellung von schalldämpfenden und energieabsorbierenden Polyurethanschäumen [production of sound-insulating and energy-absorbing polyurethane foams]" based on specific polyether polyols and modified polyisocyanates. The loss factor tan δ of the material is, according to the statements, >0.3. The use of viscoelastic substances for sound insulation is also described in structural applications. DE 39 42 760 A1 shows, for example, the use of polyvinyl butyral as a viscoelastic layer in garage door sheets. DE 698 20 676 T2 relates to a vibration-insulating composite material having an inner viscoelastic adhesive layer. DE 692 07 437 T2 describes a sound-insulating sandwich material and a method for the production thereof. A sound-insulating elastomer PUR adhesive having a mechanical loss factor of tan δ 0.3-0.4 in the frequency range of 200 Hz-2000 Hz is used.

Finally, EP 1 186 630 B1 contains an organic-hybrid insulating material which contains an insulation improver which is formed from a mixture of specific phenolic compounds.

Since the polyol component also has a substantial influence on the physical properties of the formed cellular skeleton, it is indispensable for most formulations.

Purely water-blown formulations based on isocyanate-containing compounds without further organic reactants such as polyols are therefore extremely rare. Laid-open document DE 25 24 191 contains the description of a highly-filled polyurea foam material which can be produced from polyisocyanates, water, catalysts, stabilisers and finely dispersed filling materials, but which does not have open cells.

DE 39 09 083 describes a gypsum foam material having a porous structure as well as a method for the production thereof for sound and heat insulation. A gypsum-water suspension is mixed with an MDI prepolymer without further reactants in the presence of a surfactant and is foamed to form moulded bodies.

Together with the description of a method for producing a halogen-free and filling material-containing, flame resistant polyurea foam, DE 25 241 91 A1 includes the further development of the gypsum foam material disclosed in DE 39 09 083. The bulk density of the foam material which can be achieved can be lowered considerably. In addition, by adding larger amounts of ammonium polyphosphate, an increased flame resistance of the foam is to be achieved.

However, it has been shown in practice that it is difficult to obtain the foams produced in accordance with DE 25 241 91 A1 with open cells. In order to achieve the minimum acoustic properties as set forth in accordance with its purpose of use, the foam bodies must be subsequently mechanically processed by milling or needling. A portion of the foam cells can be opened hereby. Simultaneously, the foam material loses rigidity by way of this working step. This is a disadvantage for many applications and means that structural auxiliary solutions are required. In addition, a greater extent of broadband absorption capabilities can be achieved only by way of a combination with perforated plates.

BRIEF SUMMARY OF THE INVENTION

Based on this background, the object is to provide a highly-filled mineral-organic foam system having high and broadband sound-absorbing properties in particular also in the frequency range under 1000 Hz as well as a process-reliable production method therefor. Its cellular skeleton and blowing gas used for foam formation are generated from isocyanate-containing materials by reacting with water at room temperature and the open cells can be obtained without any further processing.

The object in relation to the foam system is achieved by the features of Claim 1 and the object in relation to the production method is achieved by the features of Claim 19. The subordinate Claims disclose advantageous developments.

DETAILED DESCRIPTION OF THE INVENTION

Figure 1:
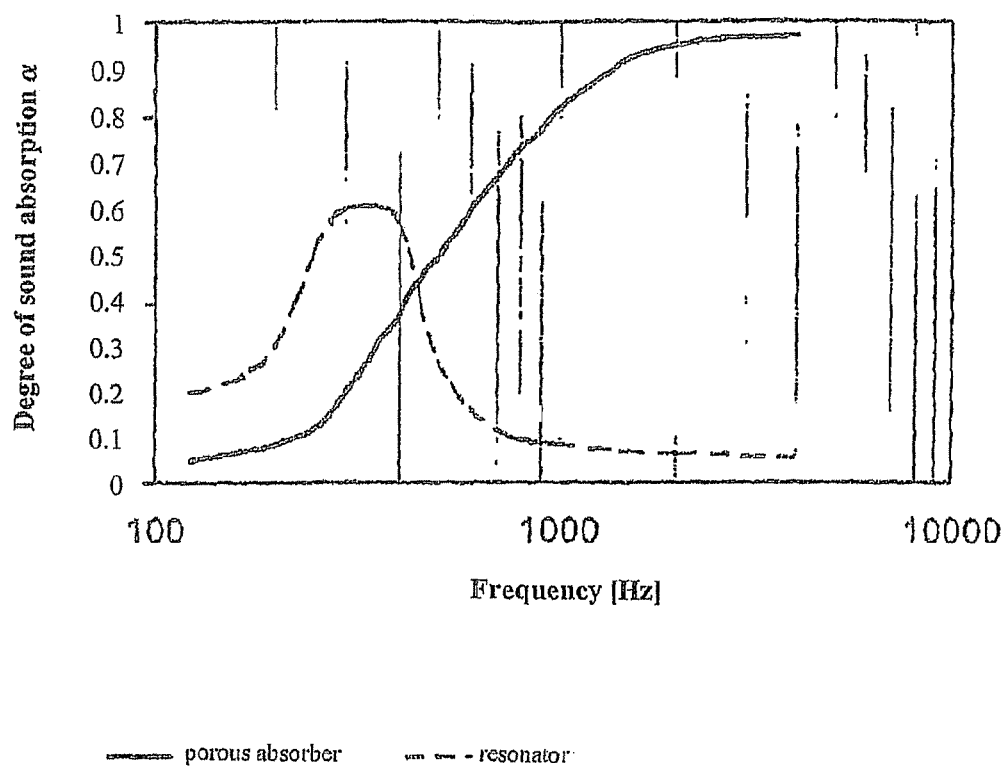
FIG. 1 shows a typical sound absorption spectrum of a resonator and porous absorber.

It has surprisingly now been found that specific lignin sulphonates in foam systems consisting of an isocyanate-containing compound and an aqueous component have a significant cell-opening effect in foam formation. The material contains the lignin sulphonate in a chemically bonded or mixed-in form, preferably in an homogeneously mixed-in form. Lignin sulphonates are salts of lignin sulphonic acid which are produced upon the sulphite pulping of lignin during the production of cellulose. The lignin sulphonates are obtained from the sulphite deposition. In this respect, see Ullmann (4) 16, 255-258, Cellulose, Holz and Lignin. Suitable lignin sulphonates can be purchased for example from ZW-Chemische-Werke, Zell-Wildhausen GmbH, Hansaallee 156 in 40549 Dusseldorf under the brand name "Collex".

In accordance with the invention, those lignin sulphonates having a molar mass between 500 and 200 000 [g/mol] are used. The preferred range is between 1 000 and 10 000 [g/mol].

In accordance with the invention, the specified lignin sulphonates can have sodium, potassium, ammonium, magnesium or calcium as counterions. Those lignin sulphonates having magnesium as a counterion are preferred.

In accordance with the invention, a formulation for producing the subject matter of the invention has between 0.05-15% by mass of lignin sulphonate relative to the total mass of the reactive mixture. A range of 1-10% by mass is preferred. The highly-filled mineral-organic foam systems have excellent sound absorption values in the frequency range >400 Hz.

The highly-filled mineral-organic foam systems in accordance with the invention are open-cell materials in which at least 50% of all the cells are open, preferably 60%-100%, particularly preferred 70%-100%.

In accordance with the invention, the highly-filled mineral-organic foam systems have bulk densities in the range of 50-200 kg/m$^3$, preferably 90-120 kg/m$^3$. They can be cut, sawn, bored and adhered.

The highly-filled mineral-organic foam systems in accordance with the invention contain polyurea as a cellular skeleton, the polyurea being produced as a condensation product from polyisocyanate prepolymers and water, wherein the sound-absorbing material consists of the cellular skeleton in an amount of 10-60% by mass, preferably 20-35% by mass.

In general, in accordance with the invention, suitable polyisocyanate prepolymers are those which comprise carbodiimide groups, allophanate groups, isocyanurate groups, urea groups, urethane groups or biuret groups. Such polyisocyanate prepolymers can be produced from aliphatic, cycloaliphatic, araliphatic, aromatic or heterocyclic polyisocyanates, such as for example those described by W. Sievken in J. Liebigs Annalen der Chemie, 562, pg. 75-136. In accordance with the Prior Art, these are produced by reacting with compounds which have hydrogen atoms which react with isocyanate. Examples hereof are alcohols, glycols, higher-molecular polyols, mercaptanes, carboxylic acids, amines, urea or amides. Such prepolymers have free reactive isocyanate groups.

Preferred prepolymers are those which are obtained by reaction from diphenylmethane-4,4'-diisocyanate. In accordance with the invention, the free isocyanate content of these prepolymers is to be between 12% and 26%, preferably between 14-20%.

The prepolymers which can be used are additionally characterised in that their viscosity at room temperature is between 500 mPas and 10 000 mPas, preferably 3 000-7 000 mPas.

In order to accelerate the foam formation, in accordance with the invention, mainly all of the catalysts known from PUR technology can optionally be used. These are, for example, tertiary amines, such as dimethylbenzylamine, dicyclohexylmethylamine, dimethylcyclohexylamine, N,N,N',N'-tetramethyldiaminodiethylether, urea derivatives, such as bis-(dimethylaminopropyl)-urea, N-methyl- or N-ethyl-morpholine, dimethylpiperazine, 1-azabicyclo[2.2.0]octane, diazabicyclo[2.2.0]octane, N-dimethylaminoethylpiperidine, 1,2-dimethylimidazole, dimethylaminoethanol, N,N,N',N'-tris(dialkylaminoalkyl)hexahydrotriazine, 2-(N,N-dimethylaminoethoxy)-ethanol, di-(4-dimethylaminocyclohexyl)-methane, or metallic salts, such as e.g., dibutyltin dilaurate, tin diethylhexoate, tin dioctate, zinc chloride, lead octate or iron-(II)-chloride or mixtures hereof. Depending upon expediency, 0.001-1.0% by mass are used relative to the isocyanate-containing component.

In accordance with the invention, the water—which is required for producing the aqueous component and for reacting with the isocyanate-containing component—can be mains water. This can optionally contain polysaccharides or modified polysaccharides in dissolved form, such as e.g., starch, xanthan or tragacanth.

The amount is 0.01-1% by mass relative to the mass of the water used.

In accordance with the invention, the amount of the water used for producing the aqueous component is 5-35% by mass, preferably 12-30% by mass, relative to the total mass of the reactive mixture for producing the subject matter of the invention.

The filling materials can be solid, inert, inorganic or organic filling materials. Suitable inorganic filling materials are for example clay, chalk, dolomite, glass powder, porcelain scraps, kaolin, sand, alkali silicates, calcium silicates or calcium sulphate dihydrate.

Suitable organic filling materials are for example wood chips or wood dust, straw, cork, polyurea, polyurethane, polyethylene, polypropylene, polyamide, polyester, polycarbonates, polyisoprene, rubber, polyether, poly-acrylonitrile.

In accordance with the invention, filling material amounts in the range of 20-80% by mass, preferably 30-60% by mass, relative to the total mass of the reactive mixture are used for producing the subject matter of the invention. In accordance with the invention, the filling materials are additionally characterised in that they have a suitable particle size range between 20 µm and 1 mm, preferably 100 µm-500 µm.

In accordance with the invention, sound-insulating substances which have a significant contribution to sound absorption <400 Hz can additionally be used. This can be achieved in the subject matter of the present invention by using viscoelastic substances which are incorporated as fine particles in the cellular skeleton where they are simultaneously excited by noise vibrations produced via sound energy. On the whole, all substances which have a mechanical loss factor in the provided usage range and dissipate the sound energy by way of relaxation processes can be used for this purpose.

In accordance with the invention, these are materials which have a loss factor tan δ>0.3 at room temperature. These materials are provided in a finely distributed manner in the isocyanate component as powdered filling material particles or in the form of fibres prior to the foaming process. In accordance with the invention, the viscoelastic particles can be selected from the group of polyurethanes, polyacrylates, polyesters, polyisoprenes, polyamides, polyolefins, polyethers, polyacetals, polyketals, polyphenols, polyketones, polyalcohols, polyureas and their derivatives, copolymers etc. and mixtures hereof. They can be of natural or synthetic origin. In accordance with the invention, the particle size of the powdered filling materials is between 5 µm-1 mm and the length of the fibrous filling materials is 1 mm-10 mm.

In accordance with the invention, cell stabilisers are added to the reactive mixture for producing the subject matter of the invention. Suitable stabilisers of this type include polysiloxane polymers with polyether groups.

In order to increase rigidity, fibre materials can be added to the formulations of the sound-absorbing material in accordance with the invention. Mainly all known natural and synthetic fibres can be used. Fibres based on polyamide, polyester, hemp, flax and coconut are preferred. The fibre length range [is] 0.1-100 mm, preferably 2-16 mm. Fibres can be added during the production to the aqueous component and also to the isocyanate component. The fibres are present in an amount of 0.5-20%, preferably 1-10% relative to the total mass of the reactive mixture for producing the subject matter of the invention. The flame resistance of the mineral-organic porous foams in accordance with the invention can be increased by adding corresponding flame retardants. Mainly all flame retardants which are known from polyurethane foam technology can be used.

Preferred flame retardants are those which release water under thermal loading. These substances include gypsum as a dihydrate or aluminium hydroxide, swellable layer minerals such as vermiculites, or montmorrilonites. Aluminium hydroxide is preferred.

In accordance with the invention, the amount is 5-35% by mass, preferably 15-30% by mass relative to the total mass of the reactive mixture for producing the subject matter of the invention.

In order to further improve the flame resistance, the organo-mineral, highly-filled, porous foams in accordance with the invention can be sprayed with a water glass-containing solution immediately after their production. The open-cell cell proportion of the material is still retained in this case. The application can be effected using a commercially available spraying device, such as e.g., a paint-spraying gun. Water glasses are melts of alkali silicates which are solidified in a vitreous manner and are soluble in water. They are characterised by their molar ratios of silicic acid to alkali silicate as well as by their density.

In accordance with the invention, mainly all of the water glass solutions, Li-, K- or Na-water glass solutions available on the market can be used. K-water glasses with an $SiO_2/K_2O$ ratio between 1.0-3.5, preferably 2.5-3.0 are preferred.

In accordance with the invention, the solids content of the water glass solution is between 10-40%, preferably 15-20%. The applied amount of the water glass solution is 0.5-10%, preferably 3-7% alkali silicate-solid in the water glass solution relative to the mass of the foam.

This feature ensures that the building material class B1, pursuant to DIN 4102, can be achieved in a process-reliable manner.

The invention also relates to a method for producing the foam system.

In accordance with the present invention, the highly-filled organo-mineral porous foam is produced from an isocyanate-containing component, hereinafter referred to as component 1, and an aqueous component, hereinafter referred to as component 2.

The selected polyisocyanate prepolymer is mixed optionally together with a cell stabiliser, a viscoelastic powdered polymer, fibres and catalysts to form component 1.

Filling materials and cell openers and optionally flame retardants and fibres are mixed together with water to form component 2 which is in the form of a suspension, wherein optionally 0.01-1% dextrin in dissolved form is present in the supplied water.

After thorough mixing of the two components, the obtained reaction mixture is fed-in in block forms and wherein foaming then occurs, forming carbon dioxide. The hardened highly-filled mineral-organic foam is present as a block and after hardening it can be processed to form corresponding moulded parts, such as e.g., plates which are then dried by applying heat until a desired residual moisture remains. The material in accordance with the invention has a high porosity, excellent sound-absorbing properties and can be varied in terms of its mechanical properties within a wide range, as will be explained in more detail in the following examples.

EXAMPLES

Example 1

Component 1

620 g of water having 0.15% dextrin dissolved therein are provided. After adding 60 g of powdered magnesium lignin sulphonate the mixture is stirred until the solid material has substantially dissolved. 800 g of calcium sulphonate dihydrate (average particle size $d_{50}$=200 μm) and 460 g aluminium hydroxide (average particle size $d_{50}$=50 μm) are then added and thoroughly mixed.

Component 2

600 g of a polyisocyanate prepolymer based on diphenyl-methane-4,4'-diisocyanate having 16% free isocyanate groups and a viscosity of 5 500 mPas are provided and 10 g of polyether-modified polysiloxane are added for stabilising the cells and the mixture is homogenised.

The two components are mixed together and placed in an open mould at room temperature. The residence time of the mixture is about 10 minutes. The inner temperature of the foam-forming mass rises from 20° C. to 42° C. The maximum foam level is achieved after about 30 minutes.

A homogenous, highly-filled foam product having a dry bulk density of 100 g/l is obtained and can be sawn to form plates without any problems. The properties are shown in Table 1.

TABLE 1

Essential properties of the foam product in Example 1

| Property | Unit | Value | Rock wool comparison |
|---|---|---|---|
| Bulk density | [kg/m³] | 100 | 90 |
| Flow resistance pursuant to DIN 29053 | [Pas/m³] | 14 100 | 20 000 |
| Sound absorption α (thickness 50 mm) pursuant to DIN 52215/ ISO 10534 (Kundt's tube) | | 0.38/250 Hz | 0.30/250 Hz |
| | | 0.82/500 Hz | 0.65/500 Hz |
| | | 0.82/1600 Hz | 0.95/1600 Hz |
| | | 0.85/2000 Hz | 0.95/2000 Hz |
| | | 0.93/4000 Hz | 0.95/4000 Hz |

As can be seen in Table 1, compared with rock wool in the frequency range <1000 Hz the material in accordance with the invention has a considerably higher sound absorption of 0.82 compared with 0.65 at 500 Hz. When classifying the plate in the field of structural engineering, the sound absorption in the frequency range <1000 Hz is an essential characteristic. For ranges >1000 Hz there is an asymptotic approximation towards the maximum value 1 in the plates in accordance with the invention and also in rock wool. The plate is classified pursuant to EN ISO 11654 "Sound absorption for use in buildings". A single value is formed from the sound absorption relating to frequency, wherein all frequency ranges are weighted to the same extent. For porous absorbers, the frequency range less than 1000 Hz is of decisive importance.

Example 2

A foam product is produced in accordance with Example 1. After removal from the mould, the obtained block is sawn into plates and these are sprayed with a 15% potassium silicate solution with a $K_2O/SiO_2$ ratio of 2.5. The applied amount measured 1.2 kg of water glass solution/m² of foam surface. The wetted plates were then dried at 70° C. and subjected to fire testing pursuant to DIN 4102. The plates achieved the building material class B1 without any problems. The properties are shown in Table 2.

TABLE 2

Essential properties of the foam product in Example 2

| Property | Unit | Value | Rock wool comparison |
|---|---|---|---|
| Bulk density | [kg/m³] | 115 | 90 |
| Flow resistance pursuant to DIN 29053 | [Pas/m³] | 14 000 | 20 000 |
| Sound absorption α (thickness 50 mm) pursuant to DIN 52215/ ISO 10534 (Kundt's tube) | | 0.38/250 Hz | 0.30/250 Hz |
| | | 0.82/500 Hz | 0.65/500 Hz |
| | | 0.83/1000 Hz | 0.90/1000 Hz |
| | | 0.85/2000 Hz | 0.95/2000 Hz |
| | | 0.93/4000 Hz | 0.95/4000 Hz |
| Building material class DIN 4102 | | B1 | A2 |

Table 2 again shows the superior properties of the material relative to the sound absorption at frequencies <1000 Hz.

Example 3

Component 1

620 g of water having 0.15% xanthan dissolved therein are provided. After adding 60 g of powdered magnesium lignin sulphonate the mixture is stirred until the solid material has substantially dissolved. 800 g of calcium sulphonate dihydrate (average particle size $d_{50}$=200 μm) and 460 g aluminium hydroxide (average particle size $d_{50}$=50 μm) are then added and thoroughly mixed.

Component 2

600 g of a polyisocyanate prepolymer based on diphenylmethane-4,4'-diisocyanate having 16% free isocyanate groups and a viscosity of 5 500 mPas are provided and 10 g of polyether-modified polysiloxane for stabilising the cells and 120 g of polyamide short staple fibres (Pa 6.6, 22 dtex/50 μm, cut length 6 mm) are added and the mixture is homogenised.

The two components are then mixed together and placed in an open mould at room temperature. The residence time of the mixture is about 10 minutes. The inner temperature of the foam-forming mass rises from 20° C. to 42° C. The maximum foam level is achieved after about 30 minutes.

A homogenous, highly-filled foam product having a dry bulk density of 105 g/l and a high degree of rigidity is obtained and can be sawn to form plates without any problems. The properties are shown in Table 3.

TABLE 3

Essential properties of the foam product in Example 3

| Property | Unit | Value | Rock wool comparison |
|---|---|---|---|
| Bulk density | [kg/m³] | 105 | 90 |
| Flow resistance pursuant to DIN 29053 | [Pas/m³] | 16 000 | 20 000 |
| Sound absorption α (thickness 50 mm) pursuant to DIN 52215/ ISO 10534 (Kundt's tube) | | 0.45/250 Hz | 0.30/250 Hz |
| | | 0.85/500 Hz | 0.65/500 Hz |
| | | 0.75/1000 Hz | 0.90/1000 Hz |
| | | 0.85/2000 Hz | 0.95/2000 Hz |
| | | 0.85/4000 Hz | 0.95/4000 Hz |

The properties of the plates in accordance with Example 3 now have a 50% higher sound absorption (0.45) than rock wool (0.30) at 250 Hz.

Example 4

Component 1

520 g of water having 0.15% of tragacanth dissolved therein are provided. After adding 140 g of liquid magnesium lignin sulphonate having a solid content of 60%, the mixture is stirred. 1000 g of glass fragments (average particle size $d_{50}$=40 μm) are added and thoroughly mixed.

Component 2

Figure 2:
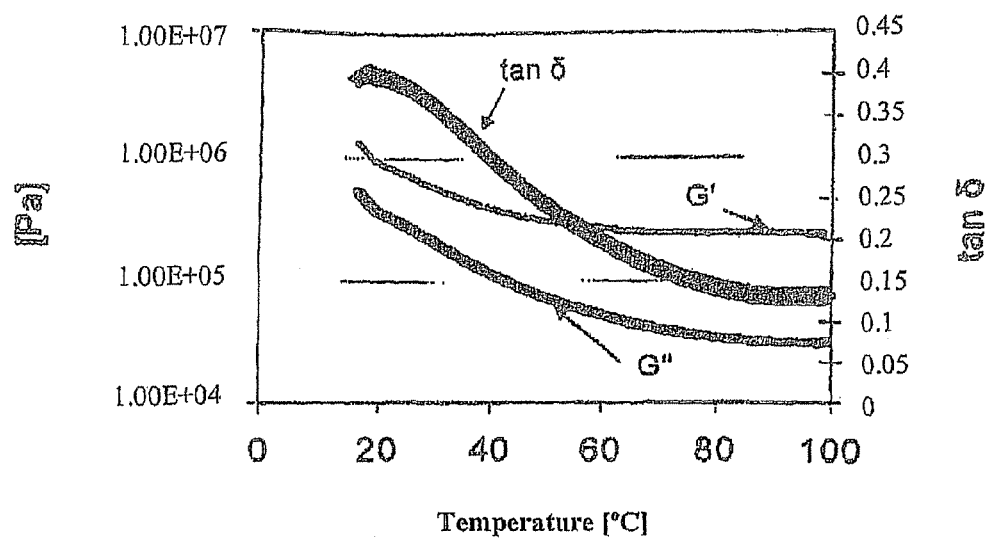
FIG. 2 shows storage modulus and loss modulus as well as loss factor tan σ of the viscoelastic polymer which is obtained by reacting the prepolymers with water in accordance with example 4.

A prepolymeric polyisocyante is firstly produced from monomeric MDI and hydroxytriglycerides having an OH number of 65. The free isocyanate content of this prepolymer is 16%. The obtained prepolymer is then converted into a foam-like polymer by way of a reaction with water. The mechanical loss factor tan δ of the product has a value at room temperature of about 0.4 (cf. FIG. 2). The obtained material is then comminuted, ground down to an average particle size $d_{90}$ of 500 μm, dried and furthermore used as a viscoelastic filling material.

600 g of a polyisocyanate prepolymer based on diphenylmethane-4,4'-diisocyanate having 16% free isocyanate groups and a viscosity of 5 500 mPas are then provided and 10 g of polyether-modified polysiloxane for stabilising the cells and 150 g of the previously produced viscoelastic filling material are added and the mixture is homogenised.

The two components are now mixed together and placed in an open mould at room temperature. The residence time of the mixture is about 10 minutes. The inner temperature of the foam-forming mass rises from 20° C. to 42° C. The maximum foam level is achieved after about 30 minutes. A homogeneous, highly-filled foam product having a dry bulk density of 110 g/l is obtained and can be sawn to form plates without any problems. The properties are shown in Table 4.

TABLE 4

Essential properties of the foam product in Example 4

| Property | Unit | Value | Rock wool comparison |
|---|---|---|---|
| Bulk density | [kg/m³] | 110 | 90 |
| Flow resistance pursuant to DIN 29053 | [Pas/m³] | 25 000 | 20 000 |
| Sound absorption α (thickness 50 mm) pursuant to DIN 52215/ ISO 10534 (Kundt's tube) | | 0.52/250 Hz | 0.30/250 Hz |
| | | 0.76/500 Hz | 0.65/500 Hz |
| | | 0.80/1000 Hz | 0.90/1000 Hz |
| | | 0.83/2000 Hz | 0.95/2000 Hz |
| | | 0.92/4000 Hz | 0.95/4000 Hz |

Table 4 again shows the superior properties of the plates in accordance with the invention in the low frequency range.

Example 5

Component 1

520 g of water having 0.15% of xanthan dissolved therein are provided. After adding 140 g of liquid magnesium lignin sulphonate having a solid content of 60%, the mixture is stirred. 1200 g of kaolin (average particle size $d_{50}$=20 μm) are then added and thoroughly mixed.

Component 2

A prepolymeric polyisocyante is firstly produced from polymeric MDI having a free isocyanate content of 24% and hydroxytriglycerides having an OH number of 60 so that the free isocyanate content of this prepolymer is 20% and its viscosity is about 12 000 mPas.

600 g of the polyisocyanate prepolymer are then provided and 10 g of polyether-modified polysiloxane for stabilising the cells are added and the mixture is homogenised.

The two components are now mixed together and placed in an open mould at 40° C. The residence time of the mixture is about 10 minutes. The inner temperature of the foam-forming mass rises from 40° C. to 61° C. The maximum foam level is achieved after about 30 minutes.

A homogeneous, highly-filled foam product having a dry bulk density of 95 g/l is obtained and can be sawn to form plates without any problems. The properties are shown in Table 5.

TABLE 5

Essential properties of the foam product in Example 5

| Property | Unit | Value | Rock wool comparison |
|---|---|---|---|
| Bulk density | [kg/m$^3$] | 95 | 90 |
| Flow resistance pursuant to DIN 29053 | [Pas/m$^3$] | 16 000 | 20 000 |
| Sound absorption α (thickness 50 mm) pursuant to DIN 52215/ ISO 10534 (Kundt's tube) | | 0.45/250 Hz | 0.30/250 Hz |
| | | 0.73/500 Hz | 0.65/500 Hz |
| | | 0.97/1000 Hz | 0.90/1000 Hz |
| | | 0.82/2000 Hz | 0.95/2000 Hz |
| | | 0.92/4000 Hz | 0.95/4000 Hz |

Again, the plates produced in accordance with Example 5 have superior properties for the sound absorption in the important range of <1000 Hz.

The invention claimed is:

1. A sound-absorbing foam system for absorbing sound, with at least 50% open cells, which is formed as a cellular skeleton, sound absorbing material comprising polyurea and lignin sulphonate in a chemically bonded and/or mixed-in form, wherein the lignin sulphonate content relative to the total weight of the material is between 1 and 10% by weight, wherein the sound-absorbing material contains polyurea in a quantity of 10 to 60% by weight, and the polyurea is produced by polycondensation of at least one polyisocyanate prepolymer in the presence of water, and the at least one polyisocyanate prepolymer is selected from the group consisting of carbodiimide group-, allophanate group-, isocyanurate group-, urea group-, and biuret group-containing polyisocyanate prepolymers, wherein the polyisocyanate prepolymer is obtained by reacting at least one di- and/or polyisocyanate with at least one at least bifunctional nucleophile selected from the group consisting of diols, glycols, dimercaptans, dicarboxylic acids, diamines, triamines, polyamines, ureas, amides and/or mixtures thereof.

2. The foam system according to claim 1, wherein the lignin sulphonate has counterions selected from the group consisting of sodium, potassium, ammonium, magnesium and/or calcium.

3. The foam system according to claim 1, wherein the weight-averaged molar mass $M_w$ of the lignin sulphonate is between 500 and 200 000 g/mol.

4. The foam system according to claim 1, wherein 60 to 100% of all the cells are open.

5. The foam system according to claim 1, wherein the foam system has a density between 50 and 200 kg/m$^3$ at 23° C. and 50% relative air humidity and equalising humidity.

6. The foam system according to claim 1 wherein the at least one polyisocyanate prepolymer has a free isocyanate group content of 12 to 26% by weight.

7. The foam system according to claim 1, wherein the viscosity, measured according to DIN 53015, of the at least one polyisocyanate prepolymer at room temperature is between 500 and 20 000 mPas.

8. The foam system according to claim 1, wherein the at least one di- and/or polyisocyanate is MDI (diphenylmethane-4,4'-diisocyanate).

9. The foam system according to claim 1, wherein the material contains at least one inert inorganic or organic additive, in a quantity of 0.5 to 80% by weight relative to the total quantity of the material.

10. The foam system according to claim 9, wherein the at least one inert inorganic or organic additive is present in particulate form, with an average particle size $d_{50}$ between 5 μm and 1 mm; or in fibre form with a fibre length between 0.1 and 100 mm.

11. The foam system according to claim 9, wherein the at least one inert inorganic or organic additive comprises:
at least one inert inorganic additive selected from the group consisting of clay, chalk, dolomite, glass powder, glass fibres, stone-mineral fibres, porcelain scraps, kaolin, sand, alkali silicates, water glasses, calcium silicates, calcium sulphate dihydrate, aluminium oxide, aluminium hydroxide, swellable layer minerals; or
at least one inert organic additive selected from the group consisting of wood chips, wood dust, straw, cork, natural fibres, polysaccharides, viscoelastic materials, polyureas, polyurethanes, polyolefins, polyamides, polyesters, polycarbonates, polyisoprenes, rubber, polyethers, polyacetals, polyketals, polyphenols, polyketones, polyalcohols, polyacrylates, poly-acrylonitriles, polysiloxanes, polysiloxanes with polyether groups, viscoelastic materials and/or derivatives, mixtures and/or copolymers thereof.

12. Foam system according to claim 9, wherein the at least one inert inorganic or organic additive comprises at least one inert organic additive which at room temperature has a mechanical loss factor tan δ>0.3.

13. A method for the production of a foam system according to claim 1, wherein
a) a lignin sulphonate-containing aqueous component is mixed with
b) a polyisocyanate prepolymer-containing component to form a reaction mixture; and
the reaction mixture is hardened with foaming with the provision that the lignin-sulphonate content of the aqueous component a) is between 1 and 20% by weight, and there are added for foam formation of the aqueous component a) and/or of the polyisocyanate prepolymer-containing component b), at least one additive with cell-stabilising effect.

14. The method according to claim 13, wherein the aqueous component a) and/or the polyisocyanate prepolymer-containing component b) contains at least one further additive with cell stabilizing effect.

15. The method according to claim 13, wherein there is added, in order to accelerate the foam formation of the aqueous component a) and/or the polyisocyanate prepolymer-containing component b), at least one catalyst, selected from the group consisting of tertiary amines urea derivatives; N-alkylmorpholines; piperazines; 1-azabicyclo[2.2.0]-octane; diazabicyclo[2.2.0]octane; N-dimethylaminoethylpiperidine; imidazoles; amino alcohols; N,N,N',N'-tris(dialkylaminoalkyl)hexahydrotriazine; di-(4-dimethylaminocyclohexyl)-methane; metallic salts and/or mixtures hereof.

16. The method according to claim 15, wherein the at least one catalyst is used, with respect to the polyisocyanate prepolymer-containing component b), in a weight ratio of 0.001 to 1.0% by weight.

17. The method according to claim 13, wherein the at least one additive with cell-stabilising effect, with respect to the polyisocyanate prepolymer-containing component b), is used in a weight ratio of 0.001 to 5.0% by weight.

18. The method according to claim 13, wherein the reaction mixture is a foam-forming mass, and the inner temperature of the foam-forming mass is <100° C.

19. The method according to claim 13, wherein the foam system is sprayed after hardening with an additive-containing solution.

20. The method according to claim 18, wherein the inner temperature of the foam-forming mass is between 20° C. and 60° C.

* * * * *